(12) United States Patent
Kim et al.

(10) Patent No.: US 8,156,893 B2
(45) Date of Patent: Apr. 17, 2012

(54) APPARATUS AND METHOD OF FABRICATING COLOR FILTER USING INK-JET TECHNIQUE

(75) Inventors: Sang-il Kim, Suwon-si (KR); Seung-joo Shin, Seoul (KR); Sung-woong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 11/780,155

(22) Filed: Jul. 19, 2007

(65) Prior Publication Data
US 2008/0136852 A1 Jun. 12, 2008

(30) Foreign Application Priority Data
Dec. 8, 2006 (KR) .................. 10-2006-0125079

(51) Int. Cl.
B05C 11/00 (2006.01)
B05B 3/00 (2006.01)
B05B 7/06 (2006.01)
B41J 29/393 (2006.01)
B41J 29/38 (2006.01)

(52) U.S. Cl. ........ 118/698; 118/680; 118/323; 118/313; 118/315; 347/19; 347/9

(58) Field of Classification Search .................. 118/300, 118/313–315, 321, 665, 679–682, 323; 427/266, 427/287, 164, 165, 466, 469; 347/9, 12, 347/13, 42, 43, 19
See application file for complete search history.

(56) References Cited

U.S. PATENT DOCUMENTS

| | | | |
|---|---|---|---|
| 6,227,647 B1 * | 5/2001 | Akahira et al. | 347/24 |
| 2003/0190419 A1 * | 10/2003 | Katagami et al. | 427/240 |
| 2004/0071872 A1 * | 4/2004 | Kawase | 427/240 |

* cited by examiner

Primary Examiner — Yewebdar Tadesse
(74) Attorney, Agent, or Firm — Stanzione & Kim, LLP

(57) ABSTRACT

An apparatus and method of fabricating a color filter using an ink-jet technique includes inclining an ink-jet head having a plurality of nozzles at a predetermined angle, moving the ink-jet head in a lengthwise direction of the color filter that is divided into a plurality of working regions, ejecting color ink into a plurality of pixels, moving the ink-jet head to the other adjacent working region after a work in a predetermined working region is completed, and ejecting color ink, wherein the ink-jet head is symmetrically arranged with its mirror-image in adjacent working regions and thereby ejecting the color ink.

9 Claims, 11 Drawing Sheets

APPARATUS AND METHOD OF FABRICATING COLOR FILTER USING INK-JET TECHNIQUE

CROSS-REFERENCE TO RELATED APPLICATIONS

This application claims the benefit of Korean Patent Application No. 10-2006-0125079, filed on Dec. 8, 2006 in the Korean Intellectual Property Office, the disclosure of which incorporated herein in its entirety by reference.

BACKGROUND OF THE INVENTION

1. Field of the Invention

The present general inventive concept relates to an apparatus and method of fabricating a color filter, and more particularly, to an apparatus and method of fabricating a color filter using an ink-jet technique.

2. Description of the Related Art

Recently, flat display devices, such as a liquid crystal display (LCD), a plasma display panel (PDP), an organic electro luminescence (EL) displays (expand exactly), a light emitting diode (LED), and a field emission display (FED), are being used to increase the size of a screen so as to display information from a TV and a computer. From among these flat display devices, LCDs are mainly used for a computer monitor and a notebook PC or the like due to low power consumption.

A color filter, which forms an image of a desired color by passing white light modulated by a liquid crystal layer, is disposed on an LCD. The color filter has a structure in which a plurality of red (R), green (G), and blue (B) pixels are arranged on a transparent substrate to have a predetermined shape. Methods of fabricating a color filter include a dyeing method, a pigment dispersion method, a printing method, and electrodeposition method or the like.

However, in the methods of fabricating a color filter as listed-above, a predetermined process must be repeatedly performed according to each color so as to form red (R), green (G), and blue (B) pixels, and thus, a process efficiency is lowered and fabrication costs increase.

Thus, a method of fabricating a color filter using an ink-jet technique by which a fabrication process is simplified and fabrication costs are reduced has been proposed. In such method of fabricating a color filter using an ink-jet technique, ink droplets of predetermined colors such as red (R), green (G), and blue (B) are ejected into each pixel region of a substrate through nozzles of an ink-jet head, and thereby, forming a pixel of a predetermined color.

FIG. 1 illustrates an example of a method of fabricating a color filter by ejecting ink into each pixel of a color filter 10 using an ink-jet head 20, FIG. 2 illustrates the color filter 10 fabricated by the method of FIG. 1 that is divided into regions according to ink thickness, FIG. 3 is a graph illustrating an ink thickness taken along line I-I' of FIG. 2, and FIG. 4 is a graph illustrating an ink thickness taken along line II-II' of FIG. 2.

Referring to FIG. 1, the ink-jet head 20 comprising first through fourth nozzles 21, 22, 23, and 24 ejects ink into each pixel 11 by passing an upper portion of the color filter 10 in a certain direction (Y-direction) while the ink-jet head 20 is inclined at a predetermined angle with respect to the color filter 10. The ink-jet head 20 moves in an X-direction and then moves in a Y-direction while ejecting ink into each pixel 11. By repeatedly performing such a process, all of the pixels 11 of the color filter 10 are filled with ink.

However, as the ink-jet head 20 moves while the ink-jet head 20 is inclined at a predetermined angle with respect to the color filter 10, a difference in the amount of ink ejected through the first through fourth nozzles 21, 22, 23, and 24 occurs according to the number of nozzles for ejecting ink in a predetermined region in which the ink-jet head 20 passes over and leaves the color filter 10.

Referring to FIGS. 2 and 3, the amount of ink ejected through the first nozzle 21 decreases in region 1 along the Y-direction and a predetermined amount of ink is ejected in region 2 along the Y-direction. However, ink ejected through the fourth nozzle 24 is ejected in region 2 to a predetermined thickness along the Y-direction and the amount of ink gradually increases in region 3 along the Y-direction.

This is because the number of nozzles passing each region (regions 1, 2, and 3) is different as the ink-jet head 20 moves in the Y-direction. In detail, in region 2, all of the first through fourth nozzles 21, 22, 23, and 24 operate and ink is ejected through the first through fourth nozzles 21, 22, 23, and 24. However, in region 1, the number of nozzles for ejecting ink gradually increases as the first nozzle 21 to the third nozzle 23 sequentially enter region 1 of the color filter 10 and in region 3, the number of nozzles for ejecting ink gradually decreases as the third nozzle 23 to the first nozzle 21 sequentially leave region 3 of the color filter 10. Thus, the amount of ink ejected in region 1 and region 3 can be larger than the amount of ink ejected in region 2.

Referring to FIGS. 2 and 4, a fin 13 in which an ink thickness rapidly increases is formed at a boundary 12 of the ink-jet head 20 along the X-direction. This is because the ink thickness of the boundary 12 can be increased when a working section of the ink-jet head 20 varies along the X-direction.

Hence, since cross-talk between an operating nozzle and a non-operating nozzle from among the first through fourth nozzles 21, 22, 23, and 24 occurs, a difference in the amount of ink ejected may occur according to the number of other simultaneously-operating adjacent nozzles. However, the reverse case may occur.

In this way, due to interference between the operating and non-operating nozzles, a difference in the amount of ink ejected through one of the first through fourth nozzles 21, 22, 23, and 24 may cause a difference in an ink thickness of a pixel and due to the non-uniformity of ink thickness in a partial region of the color filter 10, the reliability of color reproduction can be lowered and a perception of color by a viewer can be reduced.

SUMMARY OF THE INVENTION

The present general inventive concept provides a method of fabricating a color filter by which a rapid non-uniformity of thickness in a partial region of a color filter is removed, the thickness of ink is made uniform and a perception of color by a viewer is improved, and an apparatus therefor.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of fabricating a color filter using an ink-jet technique, the method including inclining an ink-jet head having a plurality of nozzles at a predetermined angle, moving the ink-jet head in a lengthwise direction of the color filter that is divided into a plurality of working regions, ejecting color ink into a plurality of pixels, moving the ink-jet head to the other adjacent working region after a work in a predetermined working region is completed, and ejecting color ink, wherein the ink-jet head is symmetrically arranged with its mirror-image in adjacent working regions and thereby ejecting the color ink.

The foregoing and/or other aspects and utilities of the present general inventive concept may be achieved by providing a method of fabricating a color filter using an ink-jet technique, the method including controlling an ink-jet head having a plurality of nozzles to be selectively inclined at one of a predetermined angle and a second predetermined angle with respect to a color filter to eject ink toward the color filter.

The controlling of the ink-jet head include inclining the ink-jet head at the predetermined angle with respect to the color filter having a plurality of working regions; moving the ink-jet head in a lengthwise direction of the color filter to eject color ink into one of the plurality of working regions of the color filter, inclining the ink-jet head at the second predetermined angle with respect to the color filter, moving the ink-jet head to eject color ink into the other adjacent region of the color filter.

The controlling of the ink-jet head may include inclining the ink-jet head at the predetermined angle with respect to the color filter having a plurality of working regions, moving the ink-jet head in a first lengthwise direction of a reciprocating motion to eject color ink into one of the plurality of working regions, inclining the ink-jet head at the second predetermined angle, and moving the ink-jet head in a second lengthwise direction of the reciprocating motion to eject color ink into the one of the plurality of working regions.

The controlling of the ink-jet head may include selecting the plurality of nozzles in a first sequence to eject the color ink into the color filter, and selecting the plurality of nozzles in a second sequence to eject the color ink into the color filter.

The controlling of the ink-jet head may include moving the ink-jet head in one of a first direction and a second direction with respect to the color filter, and selecting the plurality of nozzles in one of a first sequence and a second sequence to eject the color ink into the color filter according to the moving direction of one of the first and second direction.

The color filter may include a plurality of working regions, and the controlling of the ink-jet head may include moving the ink-jet head in one of a first direction and a second direction within one of the plurality of working regions, and selecting the plurality of nozzles in one of a first sequence and a second sequence to eject the color ink into the one of the plurality of working regions of the color filter according to the moving direction of one of the first and second direction.

The color filter may include a plurality of working regions, and the controlling of the ink-jet head may include moving the ink-jet head in one of the plurality of working regions, moving the ink-jet head in the other one of the plurality of working regions, and electing the plurality of nozzles in one of a first sequence and a second sequence to eject the color ink into the one of the plurality of working regions of the color filter according to the moving region of the plurality of the working regions.

The foregoing and/or other aspects and utilities of the present general inventive concept may be achieved by providing an apparatus to form a color filter, the apparatus including an ink-jet head having a plurality of nozzles, and a controller to control the ink-jet head to be selectively inclined at one of a predetermined angle and a second predetermined angle with respect to a color filter to eject ink toward the color filter.

The controller may control the ink-jet head to be inclined at the predetermined angle with respect to the color filter having a plurality of working regions, to move in a lengthwise direction of the color filter to eject color ink into one of the plurality of working regions of the color filter, to be inclined at the second predetermined angle with respect to the color filter, and to move to eject color ink into the other adjacent region of the color filter.

The controller may control the ink-jet head to be inclined at the predetermined angle with respect to the color filter having a plurality of working regions, to move in a first lengthwise direction of a reciprocating motion to eject color ink into one of the plurality of working regions, to be inclined at the second predetermined angle, and to move in a second lengthwise direction of the reciprocating motion to eject color ink into the one of the plurality of working regions.

The controller may select the plurality of nozzles in a first sequence to eject the color ink into the color filter, and select the plurality of nozzles in a second sequence to eject the color ink into the color filter.

The controller may control the ink-jet head to move in one of a first direction and a second direction with respect to the color filter, and to select the plurality of nozzles in one of a first sequence and a second sequence to eject the color ink into the color filter according to the moving direction of one of the first and second direction.

The color filter may include a plurality of working regions, and the controller may control the ink-jet head to move in one of a first direction and a second direction within one of the plurality of working regions, and selects the plurality of nozzles in one of a first sequence and a second sequence to eject the color ink into the one of the plurality of working regions of the color filter according to the moving direction of one of the first and second direction.

The color filter may include a plurality of working regions, and the controller may control the ink-jet head to move in one of the plurality of working regions, and to move in the other one of the plurality of working regions, and may select the plurality of nozzles in one of a first sequence and a second sequence to eject the color ink into the one of the plurality of working regions of the color filter according to the moving region of the plurality of the working regions.

The predetermined angle and the second predetermined angle may be symmetrical with respect to a reference line of the color filter.

BRIEF DESCRIPTION OF THE DRAWINGS

The above and other aspects and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
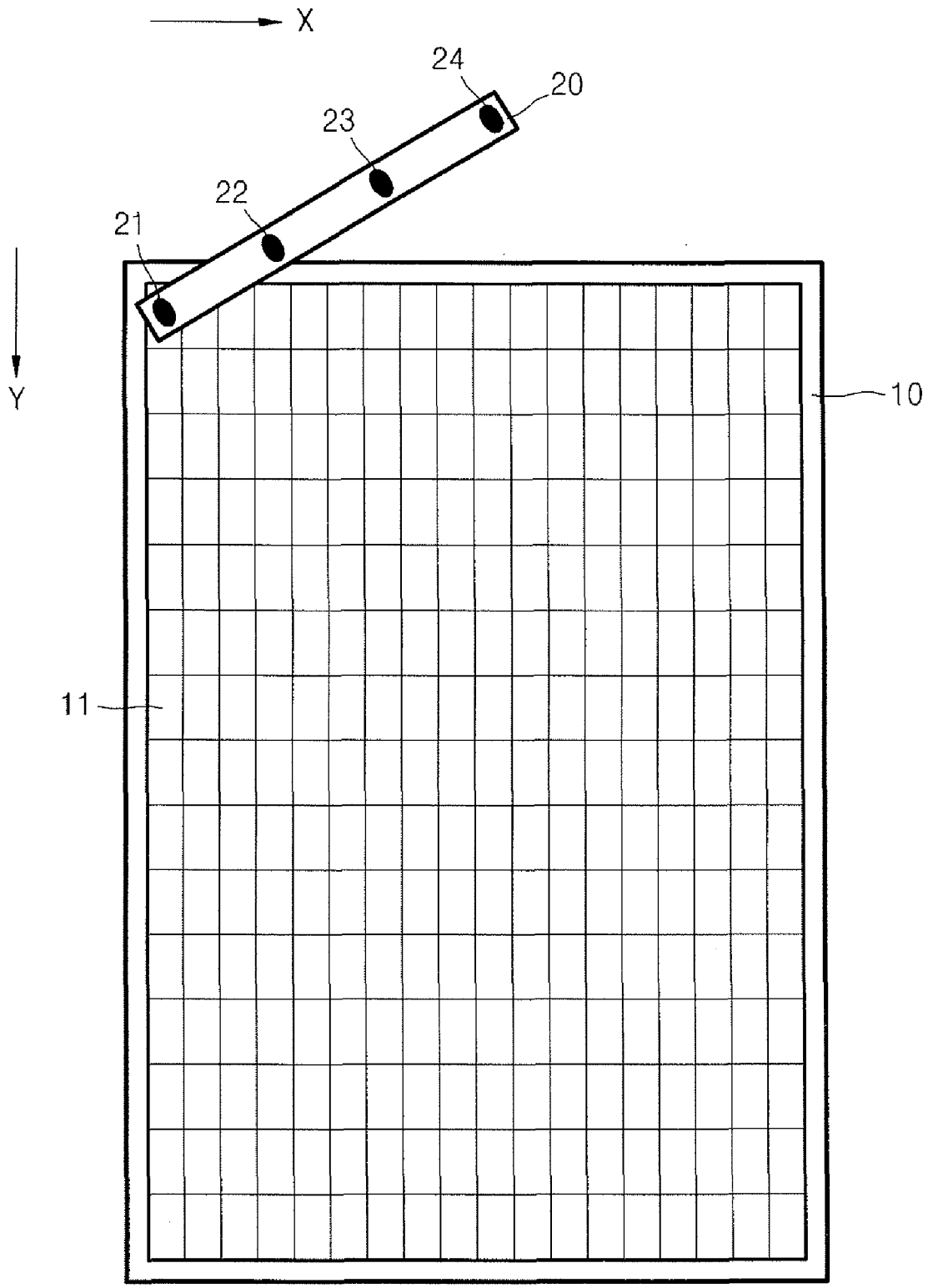
FIG. 1 illustrates an example of a method of fabricating a color filter by ejecting ink into each pixel of the color filter using an ink-jet head.
Figure 2:
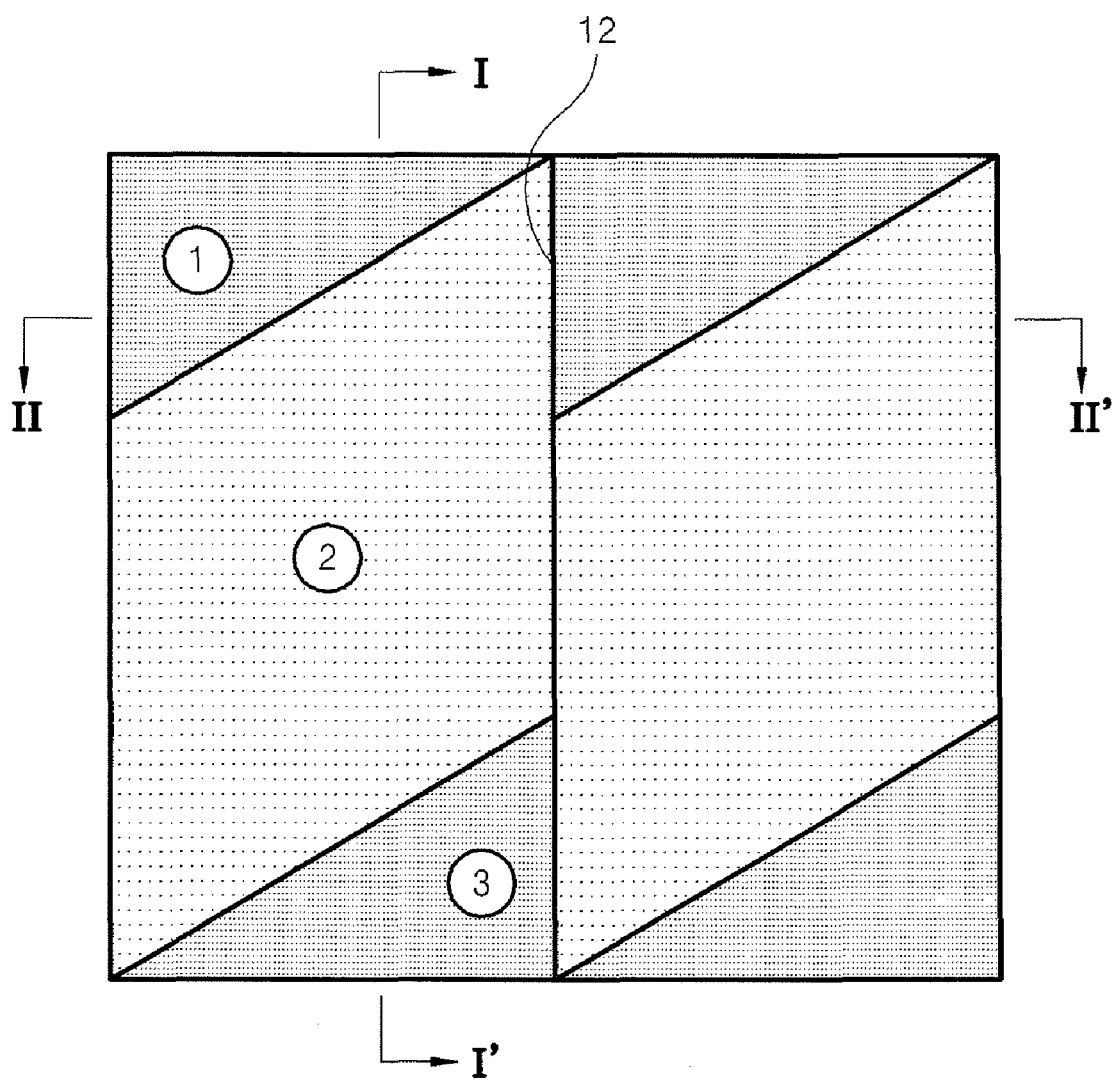
FIG. 2 illustrates the color filter fabricated by the method of FIG. 1 that is divided into regions according to ink thickness.
Figure 3:
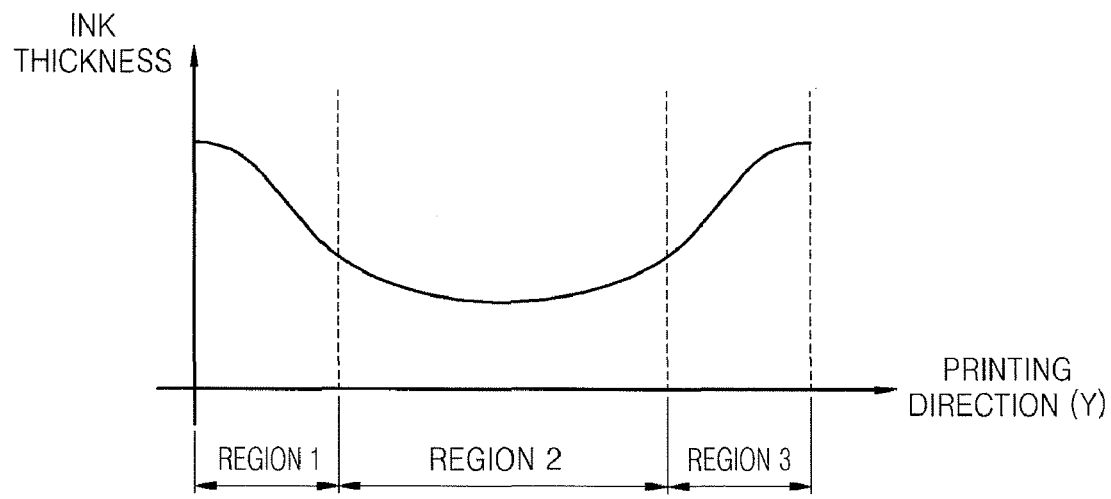
FIG. 3 is a graph illustrating an ink thickness taken along line I-I' of FIG. 2.
Figure 4:
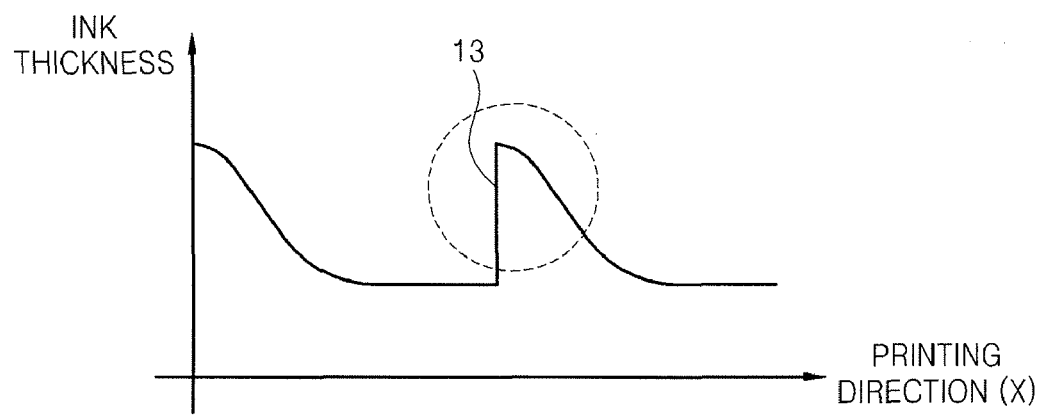
FIG. 4 is a graph illustrating an ink thickness taken along line II-II' of FIG. 2.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 5:
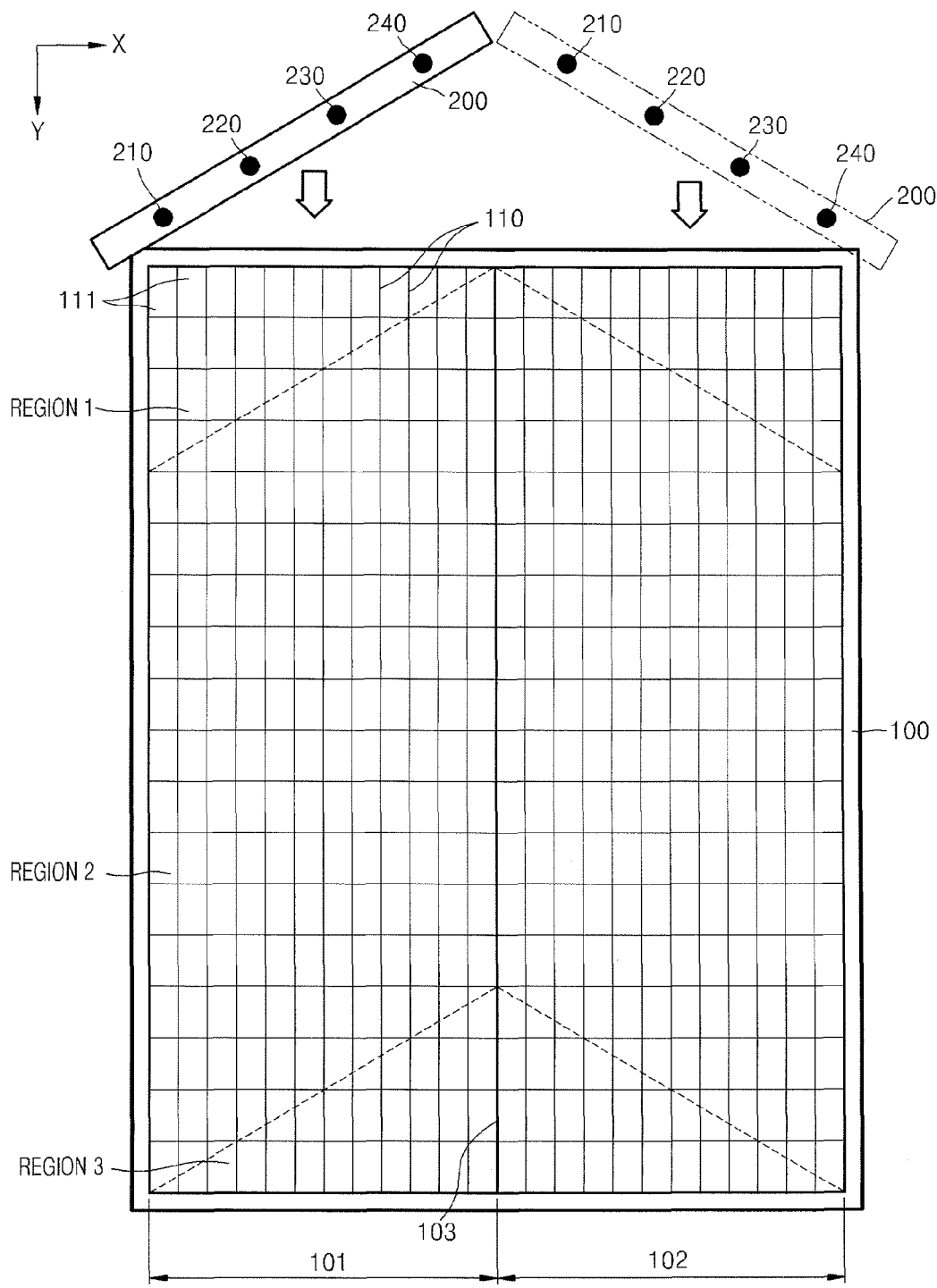
FIG. 5 illustrates a method of fabricating a color filter using an ink-jet technique according to an embodiment of the present general inventive concept.
Figure 6:
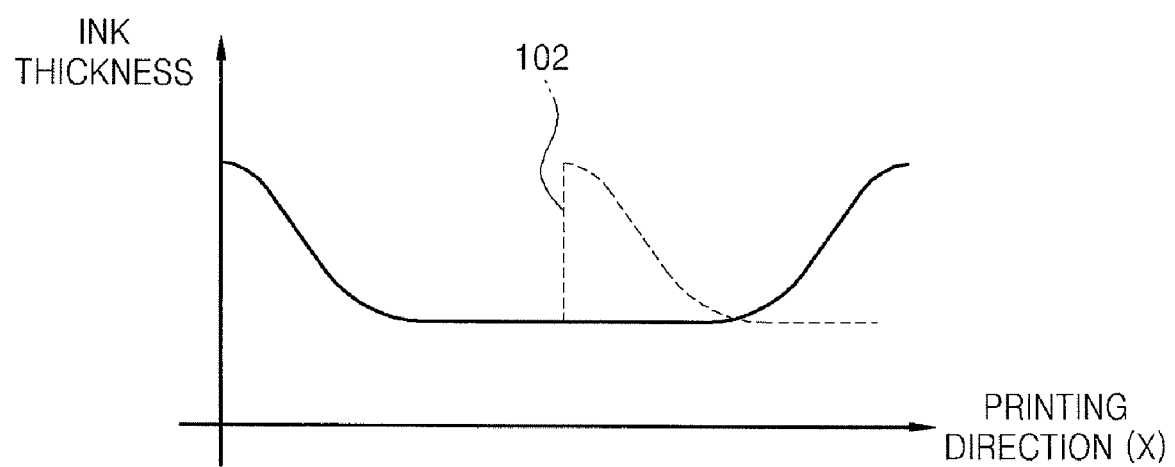
FIG. 6 is a graph illustrating an ink thickness according to a printing direction X of a color filter formed by the method of fabricating a color filter using an ink-jet technique illustrated in FIG. 5.

FIG. 5 illustrates a method of fabricating a color filter using an ink-jet technique according to an embodiment of the present general inventive concept, and FIG. 6 is a graph illustrating an ink thickness according to a printing direction X of a color filter 100 formed by the method of fabricating a color filter using an ink-jet technique illustrated in FIG. 5.

Referring to FIG. 5, the color filter 100 includes a plurality of pixels 111 defined by a black matrix 110. Red, green, and blue colors are sequentially filled in the pixels 111 and therefore, a corresponding pixel is formed.

An ink-jet head 200 may include four nozzles 210, 220, 230, and 240, and the ink-jet head 200 ejects ink into the pixels 111 by moving along an upper portion of the color filter 100 in a lengthwise direction (Y-direction) of the color filter 100 while the ink-jet head 200 is inclined at predetermined angle with respect to the color filter 100. The number of nozzles disposed in the ink-jet head 200 is not limited to the number illustrated in the drawings and may be more than the ones illustrated.

Since the ink-jet head 200 is inclined at predetermined angle with respect to the color filter 100 while the ink-jet head 200 moves along the upper portion of the color filter 100 in the lengthwise direction (Y-direction), when the ink-jet head 200 passes region 2 of the color filter 100, all of the nozzles 210, 220, 230, and 240 are operating and ink is ejected through the nozzles 210, 220, 230, and 240, when the ink-jet head 200 passes region 1 of the color filter 100, the number of nozzles that are to operate as the ink-jet head 200 moves in the lengthwise direction (Y-direction) gradually increases, and when the ink-jet head 200 passes region 3, the number of nozzles that are to operate gradually decreases.

The nozzles 210, 220, 230, and 240 of the ink-jet head 200 are disposed on a line, and the line forms the predetermined angle with a reference line of the color filter 100. The reference line of the color filter 100 may be a line parallel to one of the X and Y directions, or a line having an angle with the one of the X and Y directions.

The color filter 100 is divided into a plurality of working regions 101 and 102, and a boundary 103 is formed between the working regions 101 and 102. Making the length of the ink-jet head 200 small and dividing the color filter 100 into the working regions 101 and 102 is done to improve working conveniences because there is a limitation in making the length of the ink-jet head 200 large. Thus, after work of the working region 101 is completed using the ink-jet head 200, the same work is performed in the other adjacent working region 102. The number of working regions may be changed according to the size of the color filter 100 and the length of the ink-jet head 200.

In the present embodiment, the working regions 101 and 102, hereinafter respectively referred to as a first working region 102 and a second working region 102, are two regions for convenience of explanation.

The present embodiment is characterized in that the ink-jet head 200 is symmetrically arranged as a mirror-image in the first working region 101 and the second working region 102 with respect to the boundary 103 and as such, color ink is ejected. Hence, in the first working region 101, when the ink-jet head 200 moves in the Y-direction, the ink-jet head 200 is inclined with respect to the color filter 100 so that the nozzle 210 first passes over the color filter 100, however, in the second working region 102, the ink-jet head 200 is inclined with respect to the color filter 100 so that the nozzle 240 first passes over the color filter 100.

According to the present embodiment, the ink-jet head 200 selectively activates the nozzles 210, 220, 230, and 240 and passes the first working region 101 of the color filter 100 along a first ejecting path to selectively eject corresponding ink through the selectively selected nozzles 210, 220, 230, and 240 as described above. When the ink-jet head 200 passes the first working region 101 along the first path, the predetermined angle can be maintained constant. After finishing the ejecting operation along the first working region 101, the ink-jet head 200 is controlled or moved to have another predetermined angle with respect to the color filter 100, and then selectively activates the nozzles 210, 220, 230, and 240 and passes the second working region 102 of the color filter 100 along a second ejecting path to selectively eject corresponding ink through the selectively selected nozzles 210, 220, 230, and 240 as described above. Here, the predetermined angle and the another angle may be symmetrical with respect to the boundary 103.

The result of ejecting color ink into the color filter 100 by symmetrically arranging the ink-jet head 200 with its mirror-image between adjacent first and second working regions is illustrated in FIG. 6. As indicated by the solid line according to a printing direction X of the ink-jet head 200, ink is ejected into the color filter 100 to a nearly uniform thickness. Thus, according to the color filter 100 of the present invention, a fin 102, in which the thickness of ink rapidly increases as in the conventional method of fabricating a color filter, does not occur.

Figure 7:
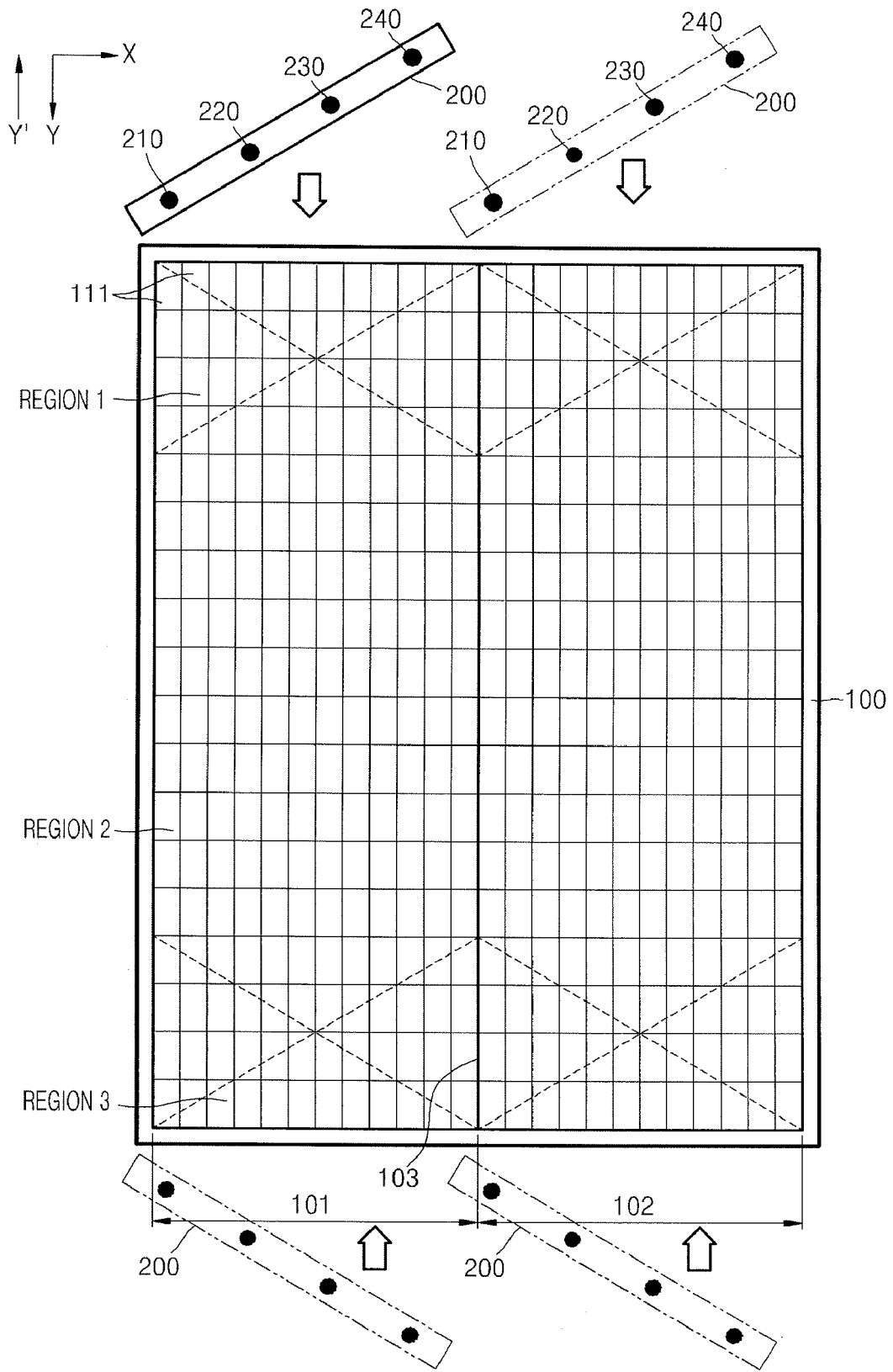
FIG. 7 illustrates a method of fabricating a color filter using an ink-jet technique according to another embodiment of the present general inventive concept.
Figure 8:
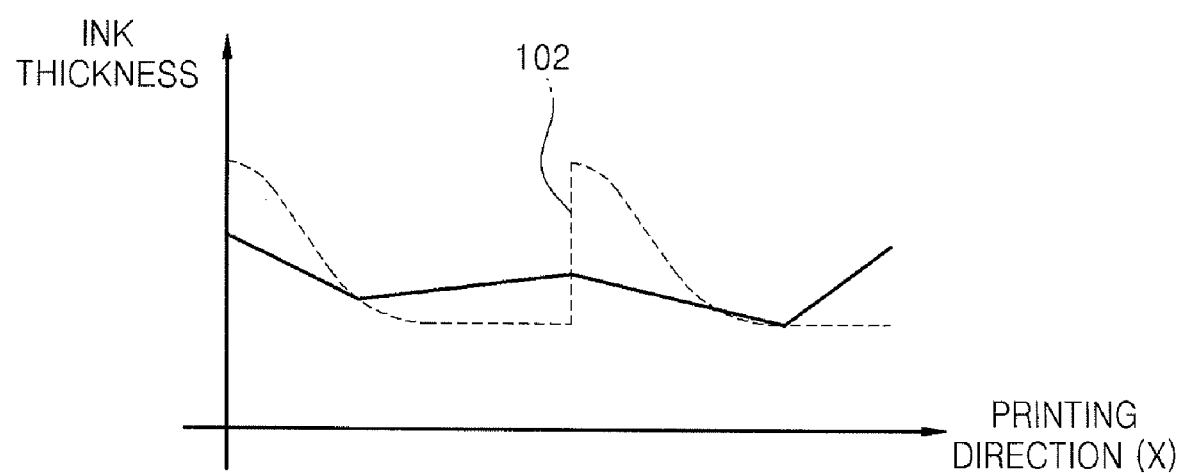
FIG. 8 is a graph illustrating an ink thickness according to a printing direction (X-direction) of a color filter formed by the method of fabricating a color filter using an ink-jet technique illustrated in FIG. 7.

FIG. 7 illustrates a method of fabricating the color filter 100 using an ink-jet technique according to another embodiment of the present general inventive concept, and FIG. 8 is a graph illustrating an ink thickness according to a printing direction (X-direction) of the color filter 100 formed by the method of fabricating the color filter 100 using an ink-jet technique illustrated in FIG. 7.

In the method of fabricating the color filter 100 using an ink-jet technique illustrated in FIG. 7, the ink-jet head 200 makes a reciprocating motion for a plurality of times in each first and second working region, color ink is ejected and is filled in corresponding pixel 111. At this time, the inclined angle of the color ink-jet head 200 varies according to a direction that the ink-jet head 200 moves.

In detail, in the first working region 101 and the second working region 102, the ink-jet head 200 moves at the same inclined angle with respect to the color filter 100 in a direction (Y-direction) of the ink-jet head 200, and in an opposite direction Y' of the ink-jet head 200, the ink-jet head 200 moves to be symmetrically arranged with its mirror-image with respect to the arrangement of the ink-jet head 200 in the Y-direction.

Thus, in both the Y-direction and the Y'-direction of the ink-jet head 200, the nozzle 210 first passes over the color filter 100.

In each working region, the number of reciprocating motions of the ink-jet head 200 is based on a design and may vary according to circumstances, and a direction may be changed at least two or more times.

That is, the ink-jet head 200 selectively activates the nozzles 210, 220, 230, and 240 and passes the first working region 101 of the color filter 100 in a first direction along a first ejecting path to selectively eject corresponding ink through the selectively selected nozzles 210, 220, 230, and 240 while having a predetermined angle with the color filter 100. After finishing the ejecting operation in the first working region 101 in the first direction along the first path, the ink-jet head 200 is controlled or moved to have another predetermined angle with respect to the color filter 100, and then selectively activates the nozzles 210, 220, 230, and 240 and passes the first working region 102 of the color filter 100 in a second direction along the first path to selectively eject corresponding ink through the selectively selected nozzles 210, 220, 230, and 240 as described above. Here, the predetermined angle and the another angle may be symmetrical with respect to the first path. And the first direction and the second direction may be opposite to each other with respect to the first region 101.

After finishing the ejecting operation in the first working region 101, the ink-jet head 200 is controller or moved to a next position corresponding to the second working region 102 as illustrated in FIG. 7. The ink-jet head 200 selectively activates the nozzles 210, 220, 230, and 240 and passes the second working region 101 of the color filter 100 in the first direction along a second ejecting path to selectively eject corresponding ink through the selectively selected nozzles 210, 220, 230, and 240 while having a predetermined angle with the color filter 100. After finishing the ejecting operation in the second working region 101 in the first direction along the second path, the ink-jet head 200 is controlled or moved to have another predetermined angle with respect to the color filter 100, and then selectively activates the nozzles 210, 220, 230, and 240 and passes the second working region 102 of the color filter 100 in the second direction along the second path to selectively eject corresponding ink through the selectively selected nozzles 210, 220, 230, and 240 as described above. Here, the predetermined angle and the another angle may be symmetrical with respect to the second path. And the first direction and the second direction may be opposite to each other with respect to the first region 101.

The result of ejecting color ink into the color filter 100 according to the present embodiment is illustrated in FIG. 8. As indicated by the solid line of FIG. 8 representing ink thickness according to a printing direction X of the ink-jet head 200, ink is ejected into the color filter 100 to a nearly uniform thickness although there is somewhat of a curvature. Thus, according to the color filter 100 that is fabricated according to the present embodiment, a fin 102, in which the thickness of ink is rapidly increased as in the conventional method of fabricating a color filter, does not occur.

Figure 9:
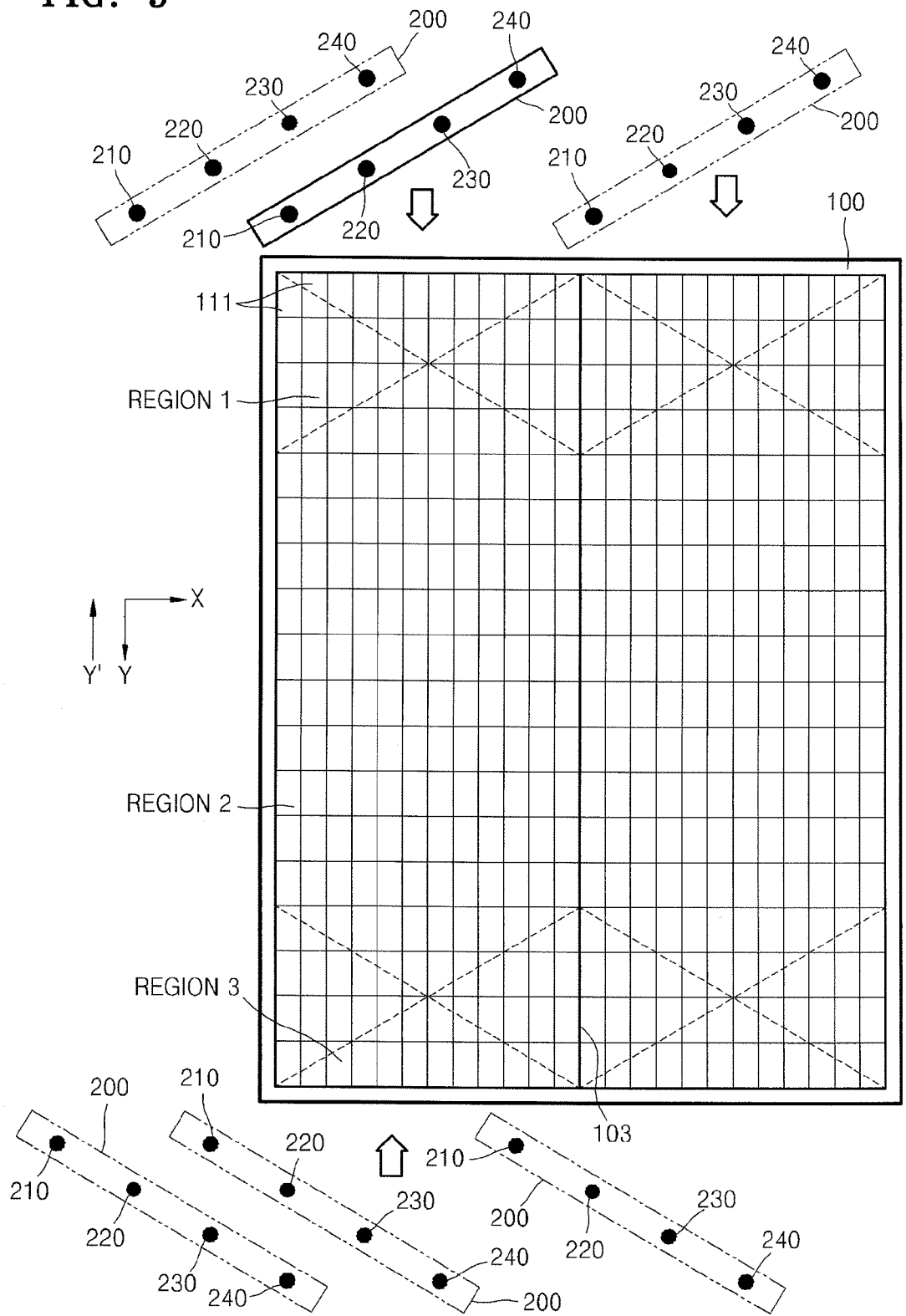
FIG. 9 illustrates a method of fabricating a color filter using an ink-jet technique according to another embodiment of the present general inventive concept.
Figure 10:
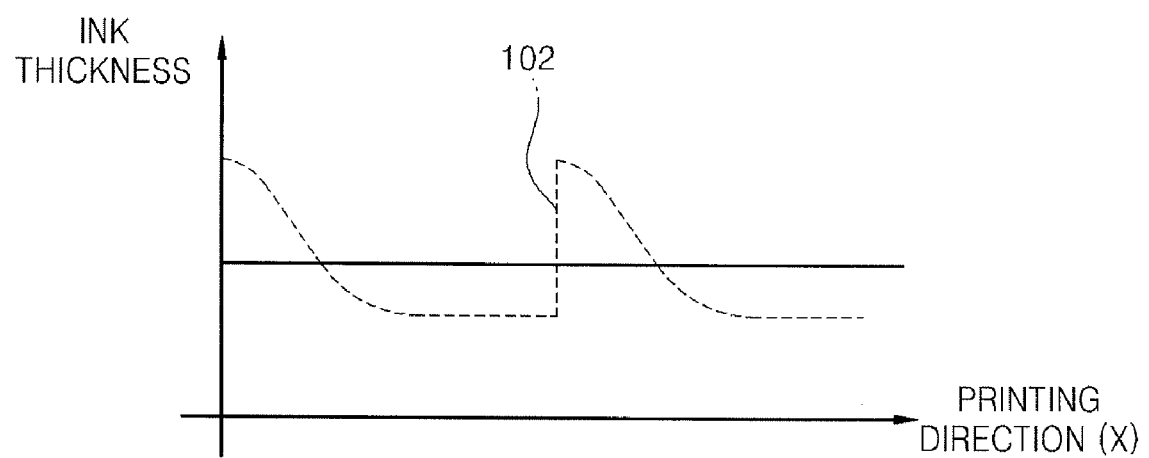
FIG. 10 is a graph illustrating an ink thickness according to a printing direction (X-direction) of a color filter formed by the method of fabricating a color filter using an ink-jet technique illustrated in FIG. 9.

FIG. 9 illustrates a method of fabricating the color filter 100 using an ink-jet technique according to another embodiment of the present general inventive concept, and FIG. 10 is a graph illustrating an ink thickness according to a printing direction (X-direction) of the color filter 100 formed by the method of fabricating the color filter 100 using an ink-jet technique illustrated in FIG. 9.

As in the method of fabricating the color filter 100 using an ink-jet technique illustrated in FIG. 7, in the first working region 101 and the second working region 102, the ink-jet head 200 moves while the ink-jet head 200 is inclined at the same angle with respect to the color filter 100 in a direction (Y-direction) of the ink-jet head 200, and the ink-jet head 200 moves while the ink-jet head 200 is symmetrically inclined with its mirror-image at the same angle with respect to the color filter 100 in an opposite direction (Y'-direction) of the ink-jet head 200.

Furthermore, color ink filled in one pixel 111 is ejected through the nozzles 210, 220, 230, and 240 of the ink-jet head 200. For example, the color ink filled in the pixel 111 is ejected through the odd-numbered nozzles 210 and 230 of the ink-jet head 200 when the ink-jet head 200 proceeds in the Y-direction, and the color ink filled in the pixel 111 is ejected through the even-numbered nozzles 220 and 240 of the ink-jet head 200 when the ink-jet head 200 proceeds in the Y'-direction. Thus, the color ink filled in the pixel 111 is filled by the color ink that is ejected through each of the nozzles 210, 220, 230, and 240 of the ink-jet head 200. At this time, the color ink is ejected into the pixel 111 sequentially through the nozzles 210, 220, 230, and 240 whenever the direction of the ink-jet head 200 is changed according to the color filter 100. As a result, one pixel 111 is filled with the color ink that is ejected through each of the nozzles 210, 220, 230, and 240.

In the present embodiment, the sequence for selecting the nozzles 210, 220, 230, and 240 of the ink-jet head 200 may be arbitrarily determined according to a direction that the ink-jet head 200 moves. Therefore, the color ink may be ejected through the even-numbered nozzles 220 and 240 of the ink-jet head 200 when the ink-jet head 200 proceeds in the Y-direction, and may also be ejected through the odd-numbered nozzles 210 and 230 of the ink-jet head 200 when the ink-jet head 200 proceeds in the Y'-direction.

The result of ejecting color ink into the color filter 100 according to present embodiment is illustrated in FIG. 10. As indicated by the solid line representing ink thickness according to a printing direction X of the ink-jet head 200, ink is ejected into the color filter 100 to a nearly uniform. Thus, when a color filter is fabricated according to another embodiment of the present invention, a fin 102, in which the thickness of ink is rapidly increased as in a conventional method of fabricating a color filter, does not occur.

Figure 11:
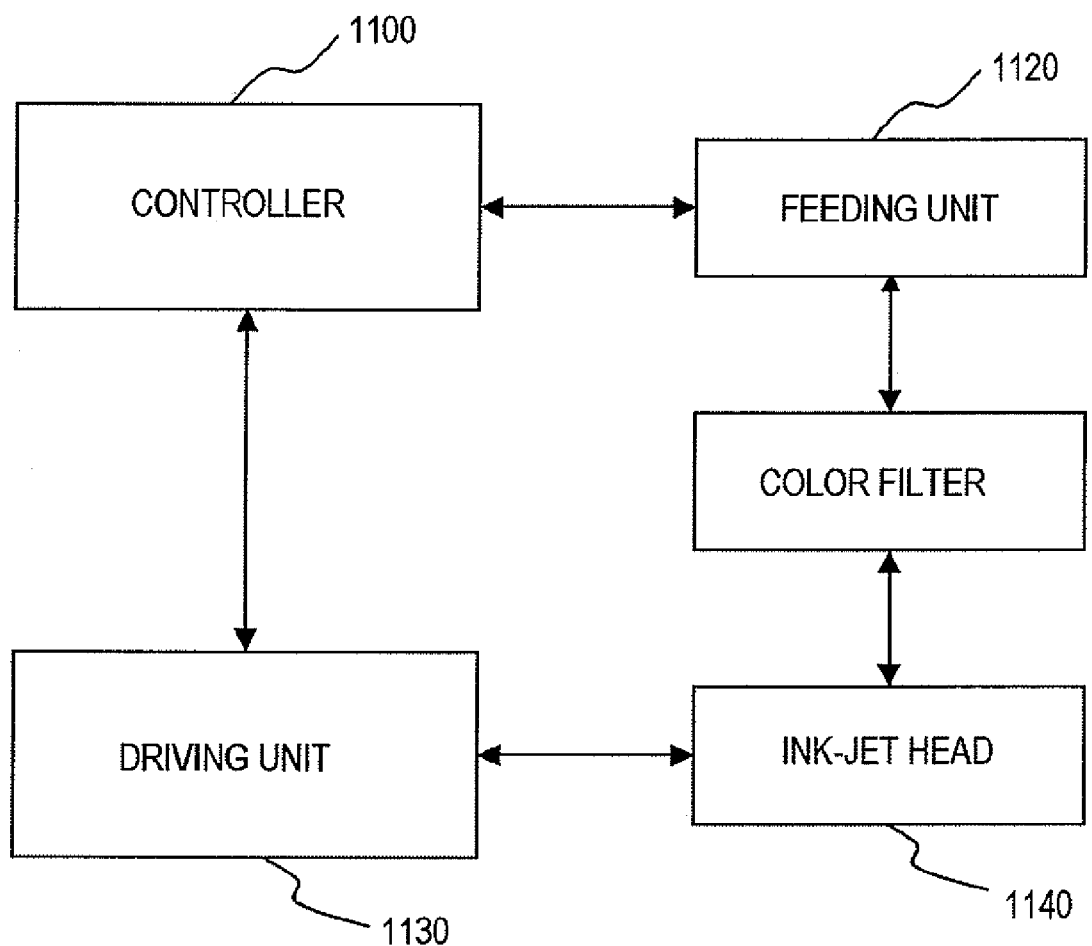
FIG. 11 is a diagram illustrating an apparatus to fabricate a color filter according to an embodiment of the present general inventive concept.

FIG. 11 is a diagram illustrating an apparatus to fabricate a color filter according to an embodiment of the present general inventive concept. Referring to FIGS. 5-11, the apparatus includes a controller 1110, a feeding unit 1120 to position a color filter, and a driving unit 1130 to drive or move an ink-jet head 1140 with respect to the color filter. The ink-jet head 1140 may be the same as the ink-jet head 200 of FIGS. 5, 7, and 9, and the color filter may be same as the color filter 100 of FIGS. 5, 7, and 9. The controller 1110 controls the feeding unit to support the color filter in a fixed position or a movable position according to a printing method, the driving unit to move the ink-jet head 1140 with respect to the color filter as described above with reference to FIGS. 5, 7, and 9, and to selectively control the nozzles of the ink-jet head to eject color ink into the corresponding pixel 111.

Figure 12:
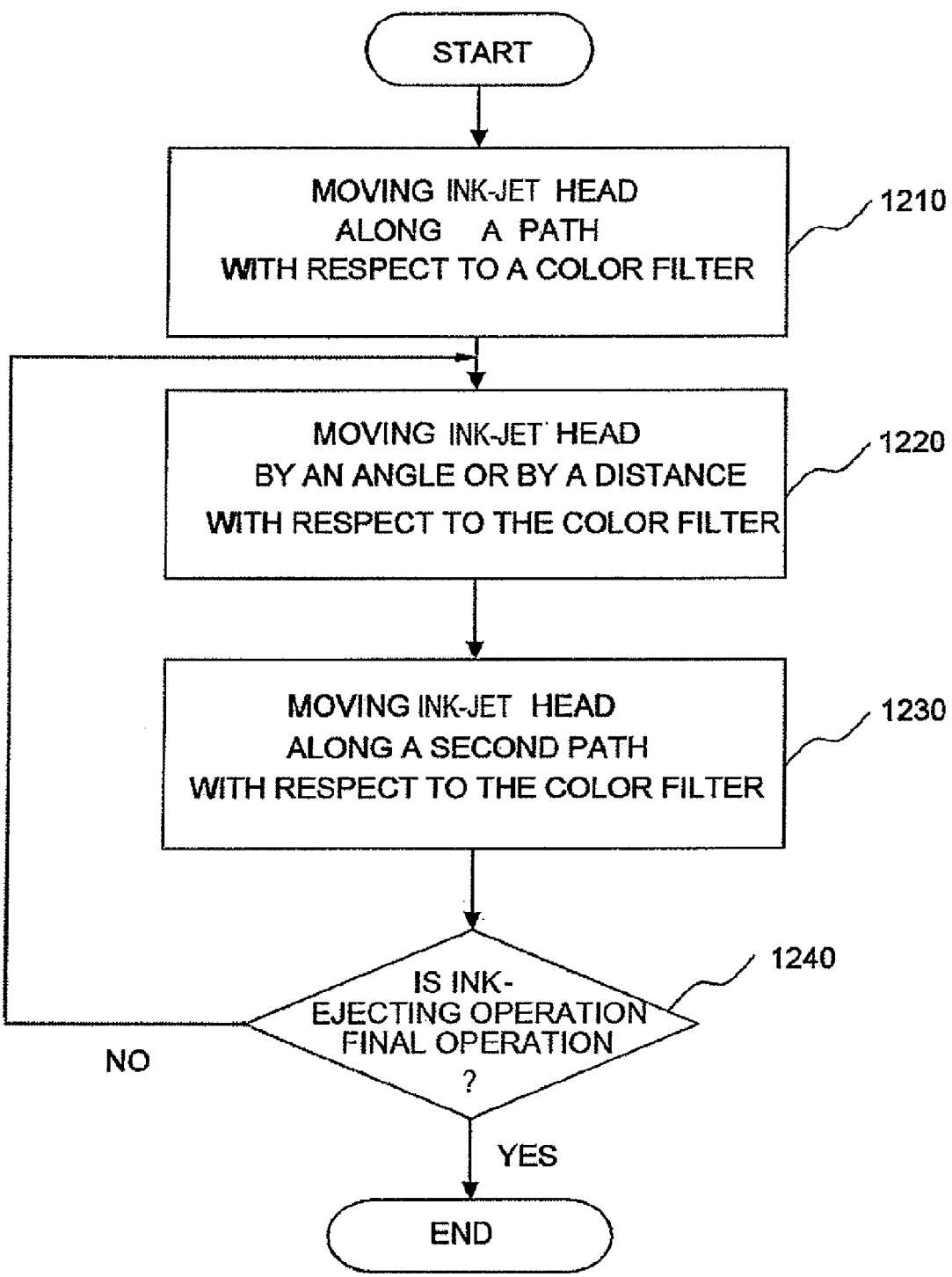
FIG. 12 is a flowchart illustrating a method of fabricating a color filter using an ink-jet technique according to another embodiment of the present general inventive concept.

FIG. 12 is a flowchart illustrating a method of fabricating a color filter according to an embodiment of the present general inventive concept. Referring to FIGS. 5, 7, 9, and 11, the method can be the same method as illustrated with reference to FIGS. 5, 7, and 9. At operation, 1210, a controller controls an ink-jet head having a plurality of nozzles to be disposed at a first position, i.e., a line having an angle with respect to a reference line of a color filter, and controls the ink-jet head to move in a first direction along a first path and to selectively eject ink through corresponding nozzles. At operation 1220, the controller controls the ink-jet head to move with respect to the color filter and to be disposed at a second position, i.e., a line having another angle with respect to the reference line of the color filter, when finishing a first ink ejecting operation in the first direction along the first path. And then, the controller controls the ink-jet head to move in a second direction along a second path and to selectively eject ink through corresponding nozzles at operation 1230. At operation 1240, the controller determines whether the ink-ejecting operation is the final operation, i.e., the ink-ejecting operation of fabricating the color filter with corresponding ink is completed. If the fabricating operation is not finished, the controller controls the ink-jet head to repeat the operations 1220 and 1240.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the method of fabricating a color filter using an ink-jet technique according to the present invention has the following effects. First, an inclination angle of an ink-jet head with respect to the color filter varies according to a direction that the ink-jet head is moving such that an effect caused by cross-talk is minimized and the ink thickness is made to be uniform across the color filter. Second, due to an improvement in uniformity of the ink thickness, uniformity in terms of brightness and a perception of color by a viewer can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to form a color filter, comprising:
an ink-jet head having a plurality of nozzles; and
a controller configured to control the ink-jet head selectively inclined at a first predetermined angle with respect to the color filter and moving in a first lengthwise direction of the color filter and selectively inclined at a second predetermined angle with respect to the color filter and moving in a second lengthwise direction of the color filter to eject ink toward the color filter, wherein the ink-jet head is disposed to move in the first and second lengthwise directions which are parallel to each other in adjacent working regions to eject the ink toward the color filter, and the first and second predetermined angles are substantially symmetrical with each other with respect to an arbitrary line parallel to the lengthwise direction, and the ink-jet head is symmetrically arranged with an ink-jet head mirror-image in adjacent working regions.

2. The apparatus of claim 1, wherein the controller controls the ink-jet head to be inclined at the first predetermined angle with respect to the color filter having a plurality of working regions, to move in the lengthwise direction of the color filter to eject color ink into one of the plurality of working regions of the color filter, to be inclined at the second predetermined angle with respect to the color filter, and to move to eject color ink into the other adjacent region of the color filter.

3. The apparatus of claim 1, wherein the controller controls the ink-jet head to be inclined at the first predetermined angle with respect to the color filter having a plurality of working regions, to move in the first lengthwise direction of a reciprocating motion to eject color ink into one of the plurality of working regions, to be inclined at the second predetermined angle, and to move in the second lengthwise direction of the reciprocating motion to eject color ink into the one of the plurality of working regions.

4. The apparatus of claim 3, wherein the number of reciprocating motions of the ink-jet head is based on a design of the ink-jet and a direction of the ink-jet head is changed at least two or more times.

5. The apparatus of claim 1, wherein the controller selects the plurality of nozzles in a first sequence to eject the color ink into the color filter, and selects the plurality of nozzles in a second sequence to eject the color ink into the color filter.

6. The apparatus of claim 1, wherein the controller controls the ink-jet head to move in one of a first printing direction and a second printing direction with respect to the color filter, and to select the plurality of nozzles in one of a first sequence and a second sequence to eject the color ink into the color filter according to the moving direction of one of the first and second direction.

7. The apparatus of claim 1, wherein:
the color filter comprises a plurality of working regions; and
the controller controls the ink-jet head to move in one of a first printing direction and a second printing direction within one of the plurality of working regions, and selects the plurality of nozzles in one of a first sequence and a second sequence to eject the color ink into the one of the plurality of working regions of the color filter according to the moving direction of one of the first and second direction.

8. The apparatus of claim 1, wherein:
the color filter comprises a plurality of working regions; and
the controller controls the ink-jet head to move in one of a plurality of working regions, and to move in the other one of the plurality of working regions, and selects the plurality of nozzles in one of a first sequence and a second sequence to eject the color ink into the one of the plurality of working regions of the color filter according to the moving region of the plurality of the working regions.

9. The apparatus of claim 1, wherein the first predetermined angle and the second predetermined angle are symmetrical with respect to a reference line of the color filter.

* * * * *